US008583085B2

(12) United States Patent
Kobayashi et al.

(10) Patent No.: US 8,583,085 B2
(45) Date of Patent: Nov. 12, 2013

(54) MOBILE EQUIPMENT, BASE STATION APPARATUS AND COMMUNICATION CONTROL METHOD

(75) Inventors: Kazunari Kobayashi, Kawasaki (JP); Tomonori Kumagai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1508 days.

(21) Appl. No.: 11/987,471

(22) Filed: Nov. 30, 2007

(65) Prior Publication Data

US 2008/0132280 A1    Jun. 5, 2008

(30) Foreign Application Priority Data

Dec. 1, 2006    (JP) .................... 2006-326174

(51) Int. Cl.
*H04B 1/38* (2006.01)
*H04W 4/00* (2009.01)

(52) U.S. Cl.
USPC ............ 455/414.1; 455/422.1; 455/436; 370/335; 370/338

(58) Field of Classification Search
None
See application file for complete search history.

(56) References Cited

U.S. PATENT DOCUMENTS

| | | | |
|---|---|---|---|
| 6,633,760 B1 * | 10/2003 | Ham et al. | 455/422.1 |
| 7,130,619 B2 * | 10/2006 | Florkey et al. | 455/414.1 |
| 2003/0035393 A1 * | 2/2003 | Sinnarajah et al. | 370/335 |
| 2004/0015607 A1 * | 1/2004 | Bender et al. | 709/238 |
| 2004/0085926 A1 | 5/2004 | Hwang et al. | |
| 2005/0063324 A1 * | 3/2005 | O'Neill et al. | 370/310 |
| 2006/0099950 A1 * | 5/2006 | Klein et al. | 455/439 |
| 2007/0153769 A1 * | 7/2007 | Comstock et al. | 370/352 |

FOREIGN PATENT DOCUMENTS

| | | |
|---|---|---|
| EP | 1347614 A2 | 9/2003 |
| JP | 2004-135292 | 4/2004 |
| WO | 2006032003 A2 | 3/2006 |

OTHER PUBLICATIONS

Extended European Search report dated Feb. 4, 2011, received in Application No. 07122020.6-2414/1928126.

* cited by examiner

*Primary Examiner* — Jinsong Hu
*Assistant Examiner* — William Nealon
(74) *Attorney, Agent, or Firm* — Smith, Gambrell & Russell, LLP

(57) ABSTRACT

A mobile equipment makes a connection setting by setting a connection to a base station apparatus, and after a communication with the base station apparatus is disconnected, makes a re-connect request to a base station apparatus that is capable of continuing the communication. The mobile equipment is allocated with a mobile equipment identifier for identifying the mobile equipment when making the connection setting, and is notified of the mobile equipment identifier and an address of a network layer of the base station apparatus to which the connection setting is made. The mobile equipment includes a connection re-establishment message processor to generate a re-connect request that includes the address and the mobile equipment identifier, and to send the re-connect request to the base station apparatus that is capable of continuing the communication, and a connection control unit to re-establish the connection to the base station apparatus that is capable of continuing the communication. The connection control unit re-establishes the connection according to mobile equipment information related to the connection setting acquired by the base station apparatus that is capable of continuing the communication, based on the address and the mobile equipment identifier.

15 Claims, 13 Drawing Sheets

MOBILE EQUIPMENT, BASE STATION APPARATUS AND COMMUNICATION CONTROL METHOD

BACKGROUND OF THE INVENTION

1. Field of the Invention

The present invention generally relates to mobile equipments, base station apparatuses and communication control methods, and more particularly to a mobile equipment, a base station apparatus and a communication control method that are applicable to a digital radio communication system such as the Long Term Evolution (LTE) system.

2. Description of the Related Art

Recently, the third generation portable telephone (International Mobile Telecommunications 2000 (IMT-2000)) system employing the Wideband Code Division Multiple Access (W-CDMA) system is becoming the mainstream of the mobile radio communication. In view of this trend, the 3rd Generation Partnership Project (3GPP), that is the standardization body for the third generation mobile communication system, is adjusting the specifications related to the LTE system so as to realize an even faster communication and to provide a higher quality service. The LTE is the next generation communication system that is also referred to as a Super 3G, S3G or 3.9G.

FIG. 1 generally shows an existing LTE system. The LTE system shown in FIG. 1 includes access gateways (aGWs) 20 ($20_1$, $20_2$) provided in a Core Network (CN) 10, base station apparatuses 30 ($30_0$, $30_1$, $30_2$, $30_3$), and a mobile equipment 40. The access gateways 20 and the base station apparatuses 30 form an LTE Radio Access Network (LTE-RAN) 35.

FIG. 2 generally shows an existing IMT-2000 that is the mainstream of the mobile radio communication system. The IMT-2000 system shown in FIG. 2 includes a switching system 60 provided in a Core Network (CN) 10, Radio Network Controllers (RNCs) 70 ($70_1$, $70_2$), base station apparatuses 80 ($80_0$, $80_1$, $80_2$, $80_3$), and a mobile equipment 90. For example, a Japanese Laid-Open Patent Application No. 2004-135292 proposes such an IMT-2000 system.

As may be seen by comparing FIGS. 1 and 2, the IMT-2000 system is provided with the radio network controllers 70 that do not exist in the LTE system.

In future mobile radio communication systems typified by the LTE system, it is desirable to simplify the network structure as much as possible. By simplifying the network structure, it would be possible to reduce the number of nodes arranged within the network, improve the communication quality, and improve the maintenance requirements.

For this reason, in the LTE system, the radio network controllers are eliminated, and instead, a portion of the functions provided in the radio network controllers is implemented in the base station apparatuses.

The radio network controller 70 of the IMT-2000 system has an important function related to the mobile control, which is one of the important functions of the mobile communication system. More particularly, the radio network controller 70 manages information of the base station apparatuses 80 and the mobile equipment 90 that are under the control of the radio network controller 70, radio resource allocation states and the like. The radio network controller 70 carries out the mobile control with respect to the base station apparatuses 80 and the mobile equipment 90 based on such information managed by the radio network controller 70. Accordingly, the radio network controller 70 needs to store all of the information related to the base stations 80 that are under the control of the radio network controller 80, the information related to other radio network controllers located in the vicinities of the radio network controller 70, the information related to the base stations that are under the control of the other radio network controllers and the like.

The radio network controller 70 carries out the mobile control with respect to the move of the mobile equipment 90 between the base station apparatuses 80 that are under the control of the radio network controller 70. In addition, with respect to the move of the mobile equipment 90 between the base station apparatus 80 that is under the control of the radio network controller 70 and the base station apparatus that is under the control of another radio network controller, the radio network controller 70 carries out the mobile control by sharing the information of the mobile equipment 90 with the other radio network controller using an interface Iur.

Next, a description will be given of the mobile control in the IMT-2000 system. It is assumed for the sake of convenience that the system structure of the IMT-2000 system is the same as that shown in FIG. 2. For example, the radio network controller $70_1$ holds its own identifier "a", and the radio network controller $70_2$ holds its own identifier "b".

A description will be given of a case where the mobile equipment 90 moves between areas covered by the base station apparatuses that are under the control of a single radio network controller, by referring to FIG. 3. FIG. 3 is a diagram for explaining a mobile control in the third generation mobile communication system.

In a step S2, the mobile equipment 90 moves from the area covered by the base station apparatus $80_1$ with which the mobile equipment 90 is communicating to the area covered by another base station apparatus $80_0$, for example.

Then, in a step S4, the mobile equipment 90 sends a reconnect request message with respect to the radio network controller $70_1$ via the base station apparatus $80_0$. This reconnect request message includes the identifier "a" of the radio network controller $70_1$ that controls the base station apparatus $80_1$ covering the area in which the mobile equipment 90 was located before moving, and the identifier of the mobile equipment 90. The mobile control is started when this reconnect request message is sent from the mobile equipment 90 to the radio network controller $70_1$.

In a step S6, the radio network controller $70_1$ which receives the reconnect request message from the mobile equipment 90 uses the identifier included in the reconnect request message to judge the radio network controller with which the mobile equipment 90 was communicating before moving, and confirms whether or not the identifier included in the reconnect request message matches the identifier of the radio network controller $70_1$.

Since the identifier included in the reconnect request message matches the identifier of the radio network controller $70_1$ in this particular case, the radio network controller $70_1$ judges that the moving destination of the mobile equipment 90 is within the area covered by the base station apparatus that is under control of the radio network controller $70_1$. Because all of the information related to the mobile equipment 90 is stored within the radio network controller $70_1$ itself, the radio network controller $70_1$ uses the mobile equipment information stored therein to carry out a procedure of resuming the communication with the mobile equipment 90.

Next, a description will be given of a case where the mobile equipment 90 moves between the area covered by the base station apparatus that is under the control of the radio network controller with which the mobile equipment 90 is communicating and the area covered by the base station apparatus that is under the control of another radio network controller, by referring to FIG. 4. FIG. 4 is a diagram for explaining the mobile control in the third generation mobile communication system.

In a step S2, the mobile equipment 90 moves from the area covered by the base station apparatus $80_1$ with which the mobile equipment 90 is communicating to the area covered by another base station apparatus $80_2$, for example.

Then, in a step S4, the mobile equipment 90 sends a reconnect request message with respect to the radio network controller $70_2$ which controls the base station apparatus $80_2$ via the base station apparatus $80_2$. This reconnect request message includes the identifier "a" of the radio network controller $70_1$ that controls the base station apparatus $80_1$ covering the area in which the mobile equipment 90 was located before moving, and the identifier of the mobile equipment 90. The mobile control is started when this reconnect request message is sent from the mobile equipment 90 to the radio network controller $70_2$.

In a step S6, the radio network controller $70_2$ which receives the reconnect request message from the mobile equipment 90 uses the identifier included in the reconnect request message to judge the radio network controller with which the mobile equipment 90 was communicating before moving, and confirms whether or not the identifier included in the reconnect request message matches the identifier of the radio network controller $70_2$.

In a step S8, since the identifier included in the reconnect request message does not match the identifier of the radio network controller $70_2$ in this particular case, the radio network controller $70_2$ judges that the moving destination of the mobile equipment 90 is within the area covered by the base station apparatus that is under control of another radio network controller. Because the radio network controller $70_2$ does not store all of the information related to the mobile equipment 90, the radio network controller $70_2$ carries out a procedure of acquiring the information related to the mobile equipment 90 from the radio network controller holding the identifier included in the reconnect request message.

In a step S10, the radio network controller $70_2$ which acquires the information related to the mobile equipment 90 carries out a procedure of resuming the communication with respect to the mobile equipment 90.

However, the following problems are encountered in the systems described above.

Generally, in the third generation mobile communication system having the radio network controllers, several tens to several hundred base stations are provided with respect to one radio network controller. For this reason, the geometrical range covered by the base stations that are under the control of a single radio network controller is several tens to several hundred times the area covered by one base station. Consequently, the mobile control for the case where the mobile equipment moves between areas covered by the base station apparatuses that are under the control of a single radio network controller is more dominant compared to the mobile control for the case where the mobile equipment moves between the area covered by the base station apparatus that is under the control of the radio network controller with which the mobile equipment is communicating and the area covered by the base station apparatus that is under the control of another radio network controller.

In addition, in the third generation mobile communication system, the number of radio network controllers provided in the vicinity of one radio network controller is not large. Hence, the information of the adjacent radio network controllers may be stored, as system data, within each radio network controller, so as to identify with relative ease the radio network controller at the moving destination of the mobile equipment.

For example, the information between two radio network controllers is exchanged via the interface Iur which provides an interface between the two radio network controllers. The radio network controller 70 that is started sets a connection to the radio network controllers provided in the vicinity of the radio network controller 70. Moreover, each radio network controller stores, as the system data, the information of the radio network controllers that have a possibility of making a communication therewith. As shown in FIG. 5, for example, if the radio network controller $70_2$ receives the identifier of the radio network controller $70_3$, as the information of the radio network controller that manages the base station apparatus covering the area in which the mobile equipment 90 was located before moving, the radio network controller $70_2$ is able to know the location of the radio network controller $70_3$ by referring to the system data stored in the radio network controller $70_2$, thereby making it possible to recognize the radio network controller $70_3$ to which the information of the mobile equipment 90 is to be inquired. FIG. 5 is a diagram for explaining the transmission and reception of the mobile equipment information in the third generation mobile communication system.

On the other hand, in the future radio communication systems, it would be desirable to implement a portion of the functions provided in the radio network controllers into the base station apparatuses, so as to simplify the network structure. For this reason, the LTE system implements a portion of the functions provided in the radio network controllers into the base station apparatuses. In other words, the management of the mobile equipment is made for each area that is relatively small. As a result, it may be seen that the following inconveniences (1) and (2) will occur, and that there is a need to simplify as much as possible the mobile control for the case where the mobile equipment moves between management areas that are covered by different base station apparatuses.

(1) The proportion of the mobile control for the case where the mobile equipment moves between management areas that are covered by different base station apparatuses increases; and (2) The number of other management areas located in the vicinity of the management area in which the mobile equipment is located increases.

Under such conditions, it is difficult to store in each base station apparatus the information of the adjacent base station apparatuses as a means of identifying the other management areas of the adjacent base station apparatuses. Consequently, there is a demand to realize the mobile control between the adjacent base station apparatuses that does not require the information of the adjacent base station apparatuses to be stored in advance, that is, does not require the network structure to be recognized.

SUMMARY OF THE INVENTION

Accordingly, it is a general object of the present invention to provide a novel and useful mobile equipment, base station apparatus and communication control method, in which the problems described above are suppressed.

Another and more specific object of the present invention is to provide a mobile equipment, a base station apparatus and a communication control method, which can suppress at least one of the problems described above, so as to enable exchange of the mobile equipment information between the base station apparatuses without requiring the information of the adjacent base station apparatuses to be stored in advance in each base station apparatus.

According to one aspect of the present invention, a mobile equipment is configured to make a connection setting by setting a connection to a base station apparatus, and after a communication with the base station apparatus is disconnected, makes a re-connect request to a base station apparatus that is capable of continuing the communication, wherein the mobile equipment is allocated with a mobile equipment identifier for identifying the mobile equipment when making the connection setting, and is notified of the mobile equipment identifier and an address of a network layer of the base station apparatus to which the connection setting is made, and the mobile equipment comprises a connection re-establishment message processor configured to generate a re-connect request that includes the address and the mobile equipment identifier, and to send the re-connect request to the base station apparatus that is capable of continuing the communication, and a connection control unit configured to re-establish the connection to the base station apparatus that is capable of continuing the communication, wherein the connection control unit re-establishes the connection according to mobile equipment information related to the connection setting acquired by the base station apparatus that is capable of continuing the communication, based on the address and the mobile equipment identifier.

According to this mobile equipment, it is possible to notify, by the re-connect request, the mobile equipment identifier that is notified when making the connection setting and the address of the network layer of the base station apparatus that makes the connection setting, thereby making it possible to re-establish the connection between the mobile equipment and the base station apparatus that is capable of continuing the communication.

According to another aspect of the present invention, a base station apparatus is configured to receive a re-connect request that is sent from a mobile equipment whose connection to the base station apparatus is disconnected, and to reconnect the base station apparatus to the mobile equipment, wherein the re-connect request includes a mobile equipment identifier for identifying an arbitrary mobile equipment that is allocated when making a connection setting, and an address of a network layer of an arbitrary base station apparatus that made the connection setting, and the base station apparatus comprises a base station information storage configured to store an address of the network layer allocated to the base station apparatus, a mobile equipment information storage configured to store mobile equipment information related to a connection setting of a mobile equipment when the base station apparatus makes the connection setting, and a connection control unit configured to reset the connection to the mobile equipment based on the mobile equipment information corresponding to the mobile equipment identifier.

According to this base station apparatus, it is possible to notify the mobile equipment identifier and the address of the network layer of the base station apparatus that makes the connection setting when making the connection setting, and re-establish the connection between the base station apparatus and the mobile equipment, based on the mobile equipment identifier and the address of the network layer of the base station apparatus that makes the connection setting.

According to still another aspect of the present invention, in a communication control method, a connection setting is made between a mobile equipment and a base station apparatus, a mobile equipment identifier allocated to each mobile equipment and an address of a network layer of the base station apparatus that makes the connection setting are notified to the mobile equipment when making the connection setting, and after a communication between the mobile equipment and the base station apparatus is disconnected, the mobile equipment makes a re-connect request to an arbitrary base station apparatus that is capable of continuing the communication, and the communication control method comprises sending the re-connect request that includes the address and the mobile equipment identifier from the mobile equipment, and resetting the connection between the arbitrary base station apparatus that is capable of continuing the communication and the mobile equipment that made the re-connect request, based on the address and the mobile equipment identifier included in the re-connect request, an address of the network layer allocated to the arbitrary base station apparatus, and mobile equipment information related to the connection setting of the mobile equipment that has the connection setting to the arbitrary base station apparatus.

According to this communication control method, the mobile equipment can notify the mobile equipment identifier and the address of the network layer of the base station apparatus that makes the connection setting when making the connection setting, and the base station apparatus can re-connect to the mobile equipment based on the mobile equipment identifier and the address of the network layer of the base station apparatus that makes the connection setting that are notified by the re-connect request.

Other objects and further features of the present invention will be apparent from the following detailed description when read in conjunction with the accompanying drawings.

DESCRIPTION OF THE PREFERRED EMBODIMENTS

Figure 1:
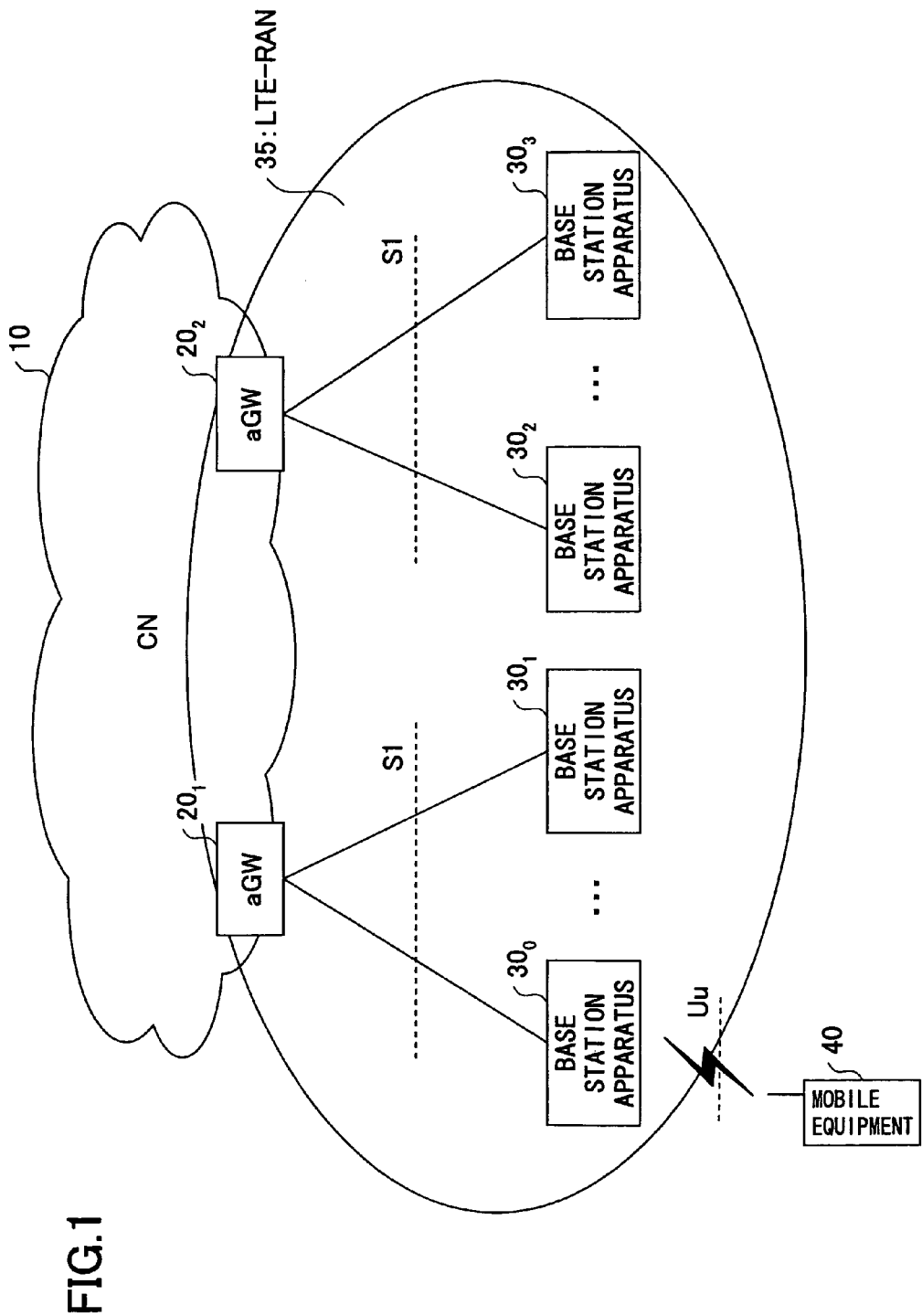
FIG. 1 is a diagram for explaining an existing LTE system.
Figure 2:
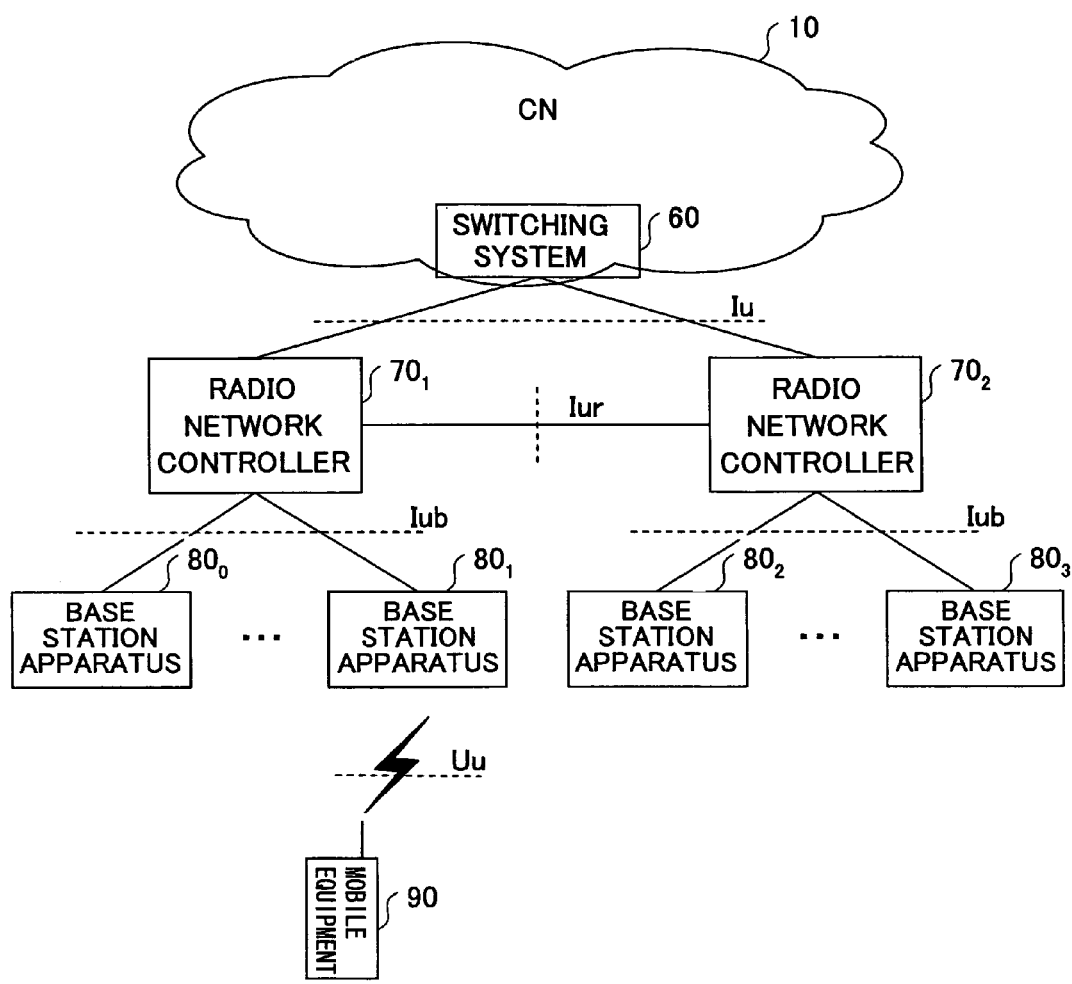
FIG. 2 is a diagram for explaining an existing IMT-2000 system.
Figure 3:
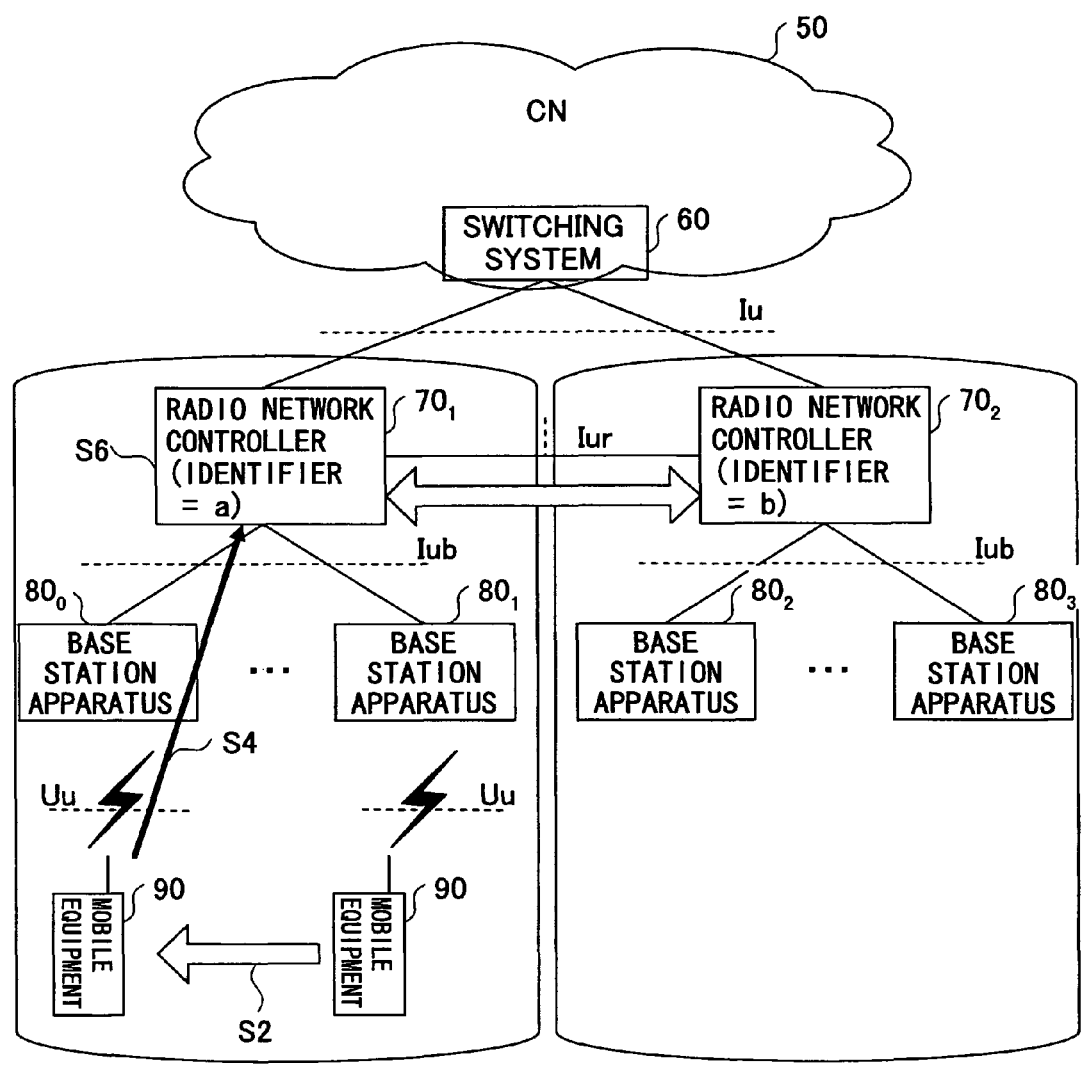
FIG. 3 is a diagram for explaining a mobile control in the third generation mobile communication system.
Figure 4:
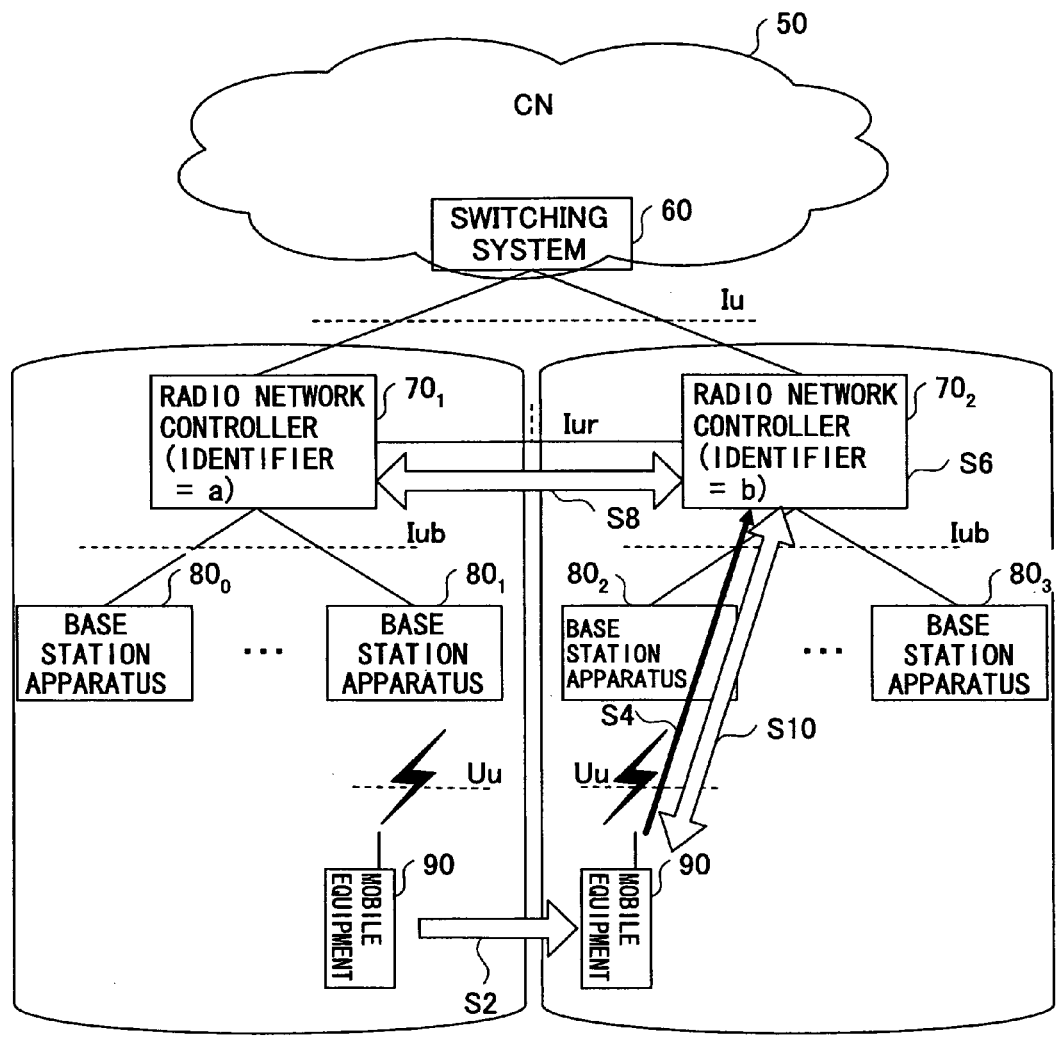
FIG. 4 is a diagram for explaining the mobile control in the third generation mobile communication system.
Figure 5:
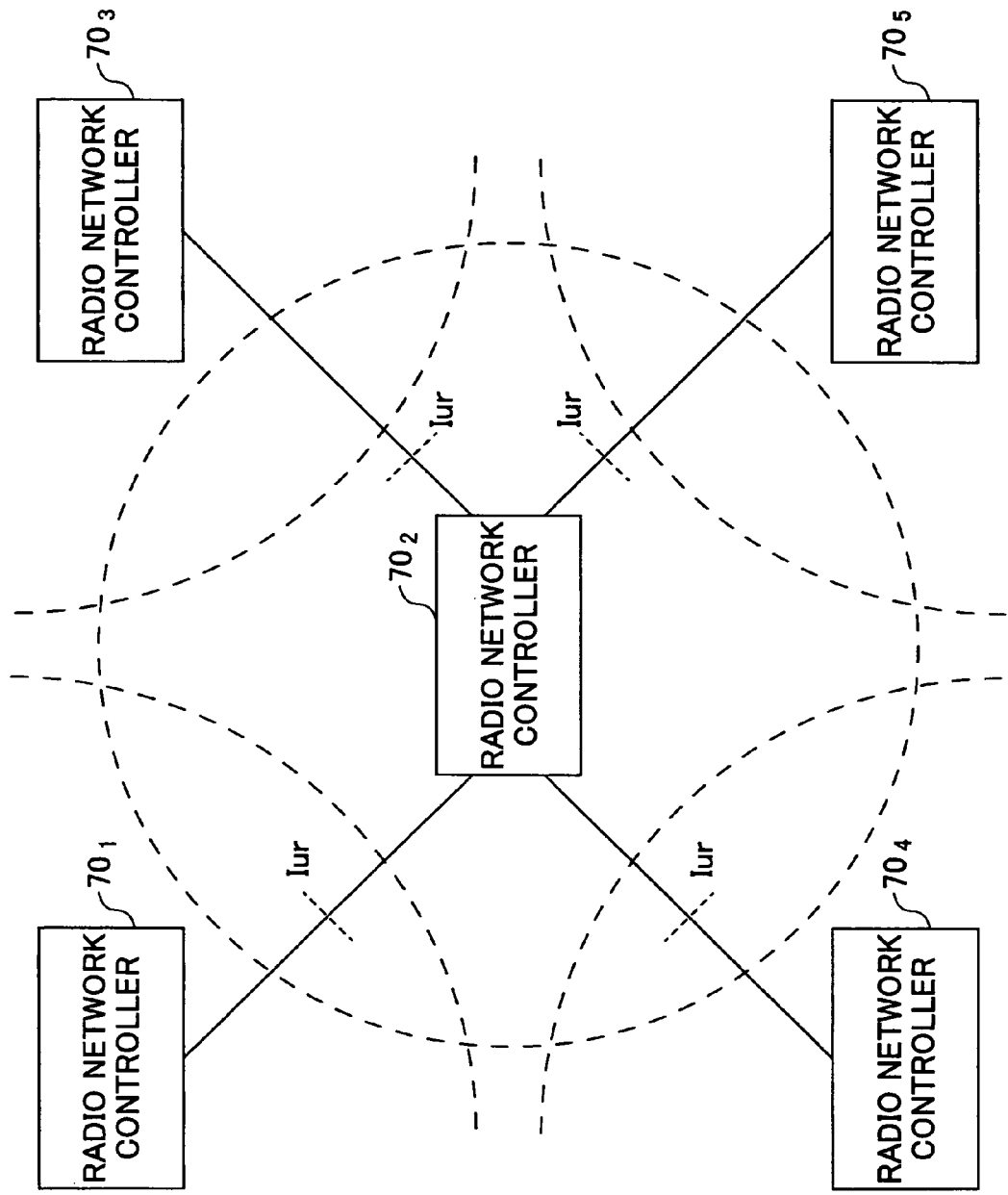
FIG. 5 is a diagram for explaining transmission and reception of mobile equipment information in the third generation mobile communication system.
Figure 6:
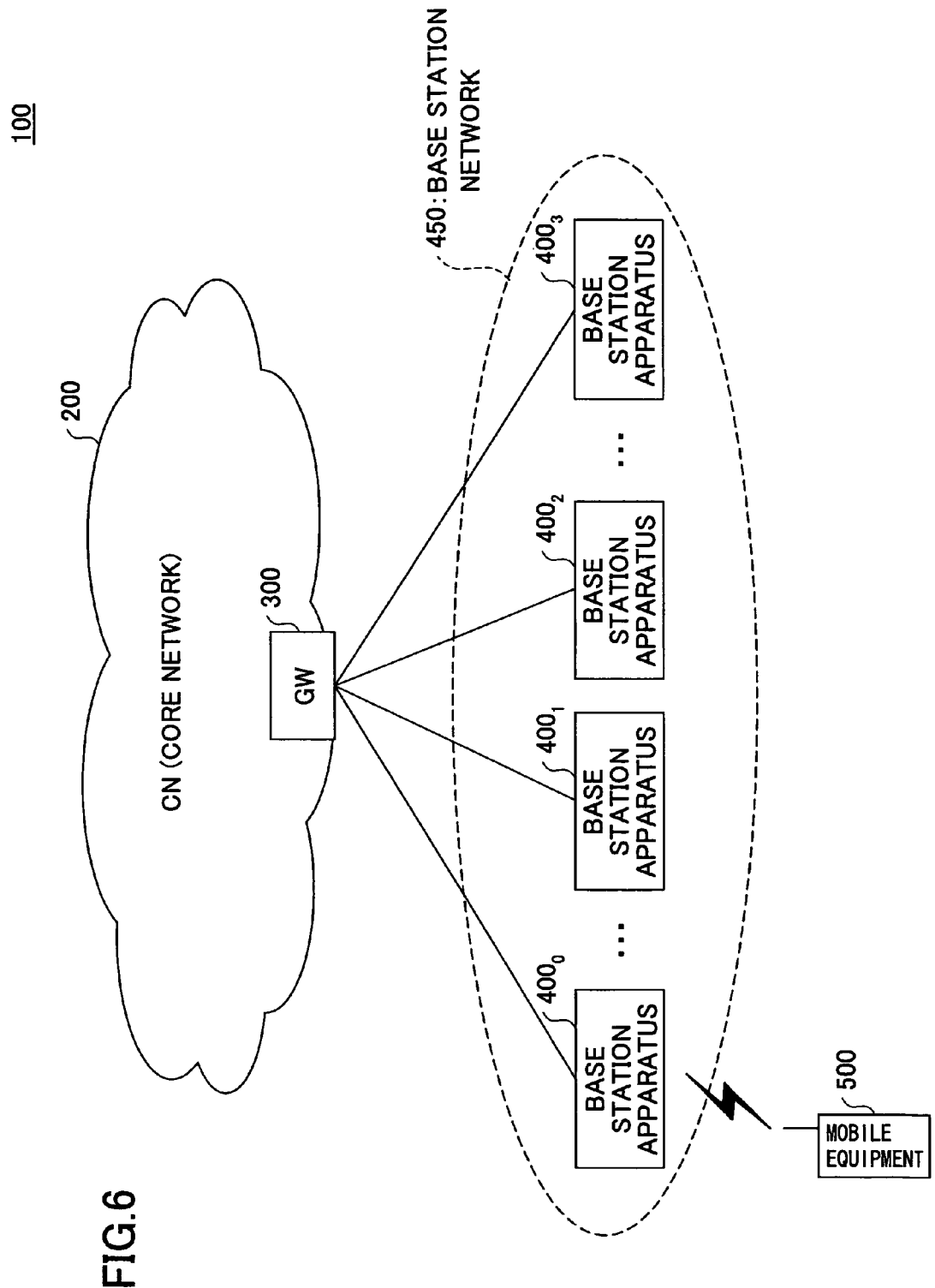
FIG. 6 is a diagram for explaining a structure of the mobile communication system in an embodiment of the present invention.

A description will be given of embodiment of the mobile equipment, the base station apparatus and the communication control method according to the present invention, by referring to FIG. 6 and the subsequent figures. In FIGS. 6 through 13, those parts that have the same functions are designated by the same reference numerals, and a description will not be repeated with respect to the parts having the same functions.

First, a description will be given of the structure of the mobile communication system to which the mobile equipment and the base station apparatus in an embodiment of the present invention may be applied. FIG. 6 is a diagram for explaining the structure of a mobile communication system 100 in this embodiment of the present invention.

In this embodiment, the mobile communication system 100 shown in FIG. 6 is an LTE system, for example, and includes a Gateway (GW) 300 that is provided in a Core Network (CN) 2000, base station apparatuses 400 ($400_0$, $400_1$, $400_2$, $400_3$), and a mobile equipment 500.

The base station apparatuses $400_0$, $400_1$, $400_2$ and $400_3$ are connected via a base station network 450, such as an IP network. An address for identifying the base station apparatus within the base station network 450, such as a network layer address, including an IP address, is allocated to each base station apparatus. Each of the base station apparatuses $400_0$, $400_1$, $400_2$ and $400_3$ can communicate with another base station apparatus within the base station network 450 by knowing the network layer address, such as the IP address, of the other base station apparatus.

In addition, the mobile equipment 500, that is located within the area covered by one base station apparatus 400, establishes a communication by radio with the base station apparatus that manages this area.

Figure 7:
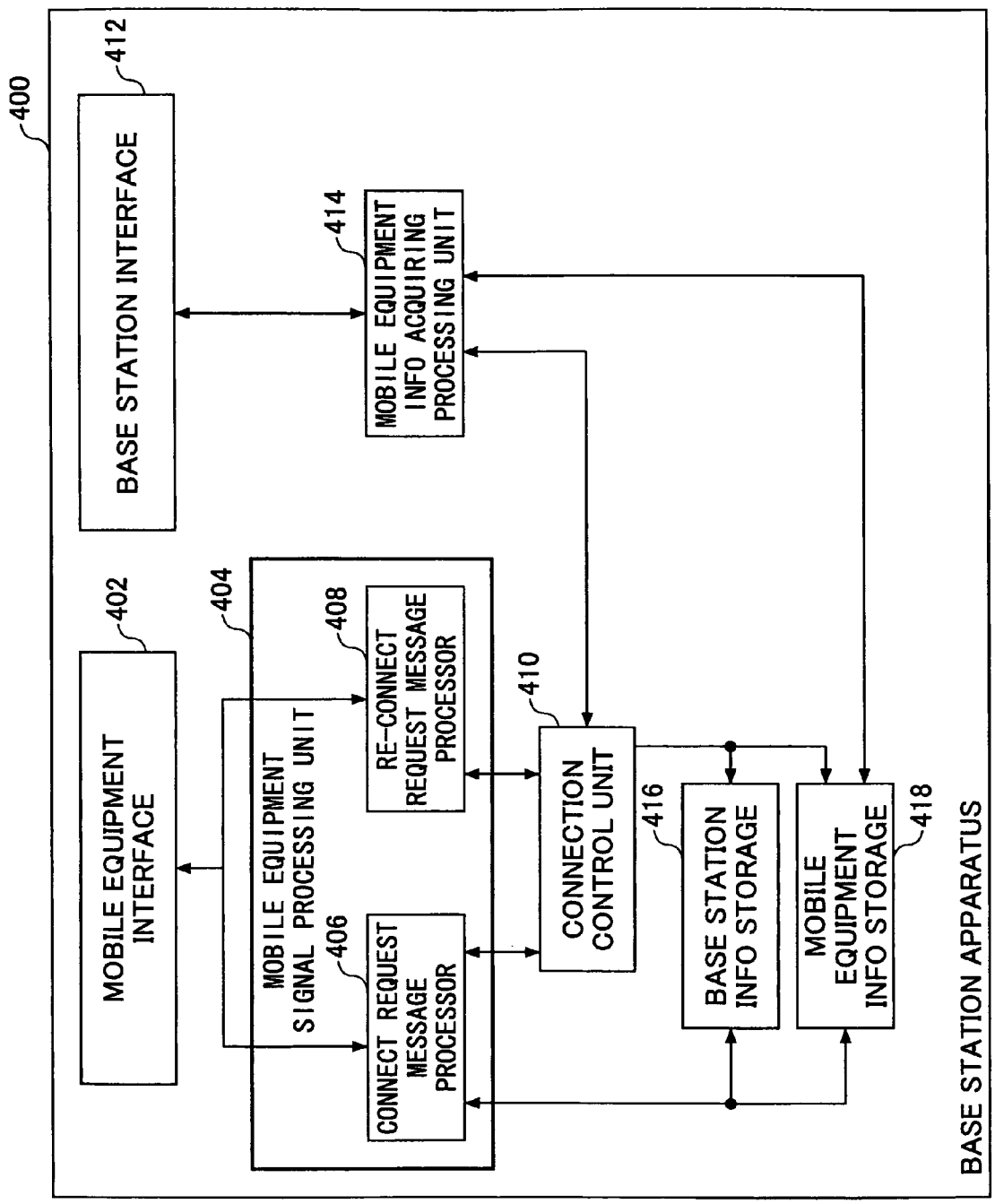
FIG. 7 is a block diagram showing a structure of a base station in the embodiment of the present invention.

A description will now be given of the base station apparatus 400 of this embodiment, by referring to FIG. 7. FIG. 7 is a block diagram showing a structure of the base station 400 in this embodiment of the present invention.

The base station apparatus 400 includes a mobile equipment interface 402, a mobile equipment signal processing unit 404, a connection control unit 410, a base station interface 412, a mobile equipment information acquiring processing unit 414, a base station information storage 416, and a mobile equipment information storage 418. The mobile equipment signal processing unit 404 includes a connect request message processor 406 and a reconnect request message processor 408.

The mobile equipment interface 402 forms an interface between the base station apparatus 400 to which the mobile equipment interface 402 belongs and the mobile equipment 500. The base station interface 412 forms an interface between the base station apparatus 400 to which the base station interface 412 belongs and another base station apparatus 400.

The connect request message processor 406 notifies the connection control unit 410 when the connect request message is received from the mobile equipment 500.

The connection control unit 410 carries out a predetermined connection process based on the connect request message that is notified from the connect request message processor 406, so as to allocate the mobile equipment identifier for identifying the mobile equipment 500 to the mobile equipment 500 and to set the connection between the base station apparatus 400 and the mobile equipment 500. When establishing the connection, the connection control unit 410 notifies, with respect to the mobile equipment 500, the network layer address information of the base station apparatus 400 to which the connection control unit 410 belongs, in the base station network 450, which network layer address information is stored in the base station information storage 416 which will be described later. In addition, the connection control unit 410 stores, in the mobile equipment information storage 418, the mobile equipment information related to the connection setting of the mobile equipment 500 to which the connection has been set from the base station apparatus 400, in correspondence with the mobile equipment identifier that is allocated to the mobile equipment 500.

The reconnect request message processor 408 notifies the connection control unit 410 when the reconnect request message is received from the mobile equipment 500.

Based on the reconnect request message notified from the reconnect request message processor 408, the connection control unit 410 confirms the network layer address information of the base station apparatus included in the reconnect request message, and judges whether or not the mobile equipment 500 was communicating with the base station apparatus 400 to which the connection control unit 410 belongs before the mobile equipment 500 sent the reconnect request message, that is, before the communication was disconnected. For example, the connection control unit 410 judges whether or not the network layer address included in the reconnect request message that is received from the mobile equipment 500 matches the network layer address that is allocated to the base station apparatus 400 to which the connection control unit 410 belongs.

More particularly, the connection control unit 410 judges whether or not the network layer address of the base station apparatus included in the reconnect request message matches the network layer address that is allocated to the base station apparatus 400 to which the connection control unit 410 belongs and is stored in the base station information storage 416, so as to judge that the mobile equipment 500 was communicating with the base station apparatus 400 if the network layer addresses match, and to judge that the mobile equipment 500 was not communicating with the base station apparatus 400 if the network layer addresses do not match.

If the connection control unit 410 judges that the mobile equipment 500 was communicating with the base station apparatus 400 to which the connection control unit 410 belongs, the connection control unit 410 re-establishes the connection between the base station apparatus 400 and the mobile equipment 500 using the mobile equipment information corresponding to the mobile equipment identifier that was notified by the reconnect request message stored in the mobile equipment information storage 418.

On the other hand, if the connection control unit 410 judges that the mobile equipment 500 was not communicating with the base station apparatus 400 to which the connection control unit 410 belongs, the connection control unit 410 re-establishes the connection between the mobile equipment 500 and the base station apparatus (hereinafter referred to as the previously-communicating base station apparatus) with which the mobile equipment 500 was communicating before moving, using the mobile equipment information corresponding to the mobile equipment identifier that was notified by the reconnect request message stored in the mobile equipment information storage 418. For example, the connection control unit 410 communicates with the previously-communicating base station apparatus using the protocol employed by the base station network 450. In a case where the IP protocol is used as the network layer protocol employed by the base station network 450, for example, the connection control unit 410 communicates with the previously-communicating base station apparatus by sending IP packets to the IP address of the previously-communicating base station apparatus.

When the communication is established between the previously-communicating base station apparatus and the mobile equipment 500, the mobile equipment information acquiring processing unit 414 requests the mobile equipment information with respect to the previously-communicating base station apparatus. More particularly, the mobile equipment information acquiring processing unit 414 notifies a mobile equipment information acquisition request that includes the mobile equipment identifier, with respect to the previously-communicating base station apparatus.

Based on the mobile equipment identifier included in the notified mobile equipment information acquisition request, the mobile equipment information acquiring processing unit 414 of the previously-communicating base station apparatus identifies the mobile equipment information corresponding to the mobile equipment identifier stored in the mobile equipment information storage 418 of the previously-communicating base station apparatus, and notifies the identified mobile equipment information to the base station apparatus 400 that is the source of the mobile equipment information acquisition request.

The base station information storage 416 stores the network layer address information of the base station apparatus 400 to which the base station information storage 416 belongs. For example, in the case where the IP protocol is used as the network layer protocol employed by the base station network 450, for example, the base station information storage 416 stores the IP address of the base station apparatus 400 to which the base station information storage 416 belongs.

The mobile equipment information storage 418 stores the mobile equipment identifier that is allocated to each mobile equipment and is used to identify each mobile equipment when setting the connection between the base station apparatus and each mobile equipment, and information related to the connection setting of the mobile equipment. The information related to the connection setting of the mobile equipment is stored in the mobile equipment information storage 418, in correspondence with the mobile equipment identifier, and includes information related to the capability or capacity of the mobile equipment, the code used, the service provided, and the like. For example, the information related to the capability or capacity of the mobile equipment includes information that indicates a bandwidth in which the transmission and reception is possible.

Figure 8:
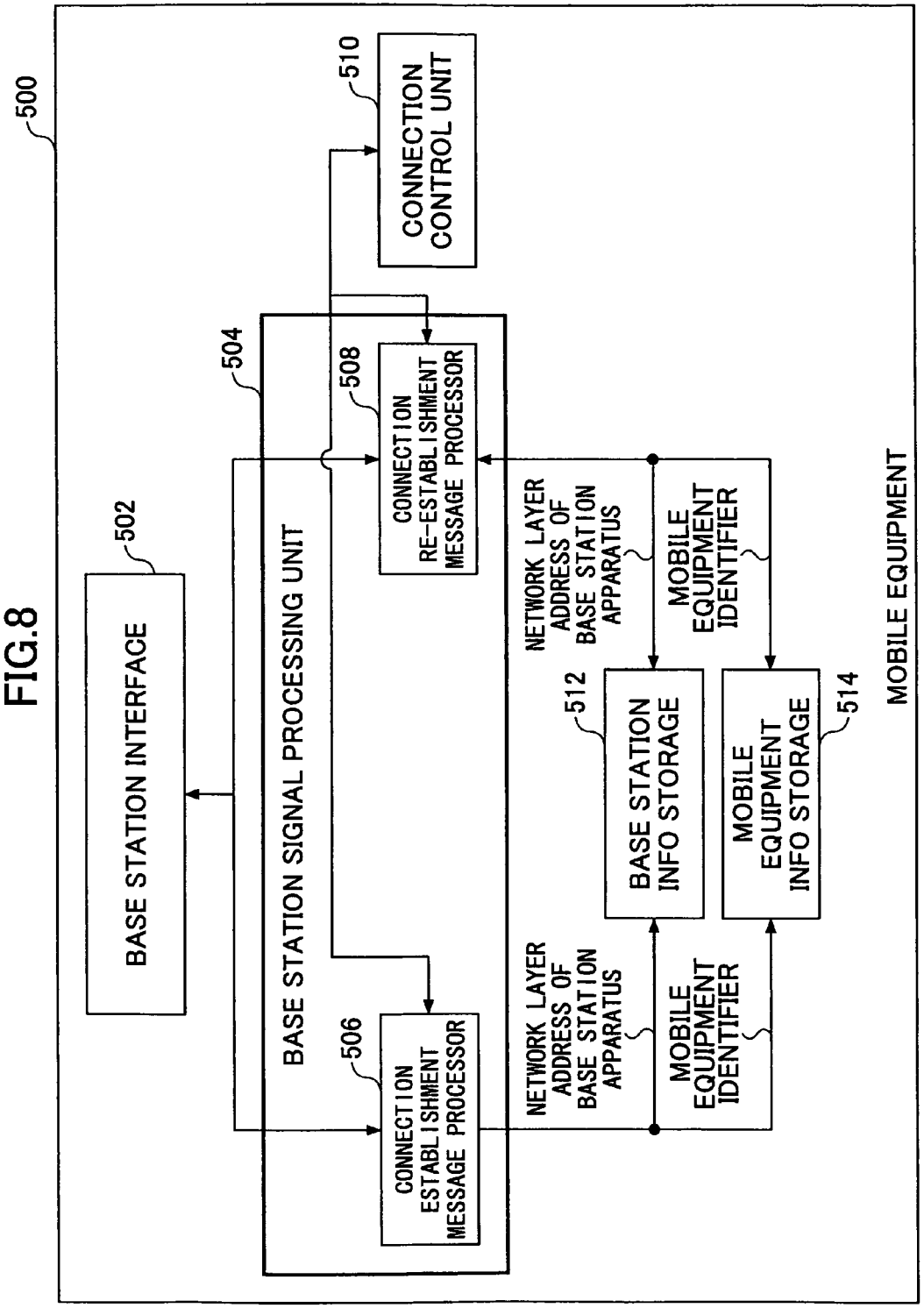
FIG. 8 is a block diagram showing a structure of the mobile equipment in the embodiment of the present invention.

Next, a description will be given of the mobile equipment 500 in this embodiment, by referring to FIG. 8. FIG. 8 is a block diagram showing a structure of the mobile equipment 500 in this embodiment of the present invention.

The mobile equipment 500 shown in FIG. 8 includes a base station interface 502, a base station signal processing unit 504, a connection control unit 510, a base station information storage 512, and a mobile equipment information storage 514. The base station signal processing unit 504 includes a connection establishment message processor 506, and a connection re-establishment message processor 508.

The base station interface 502 provides an interface between the mobile equipment 500 to which the base station interface 502 belongs and the base station apparatus 400.

The connection establishment message processor 506 generates a message that is required to establish a connection between the mobile equipment 500 to which the connection establishment message processor 506 belongs and the base station apparatus 400, and sends this message via the base station interface 502. In addition, when establishing the connection, the connection establishment message processor 506 stores in the base station information storage 512 the network layer address information of the base station apparatus 400 in the base station network that is notified from the base station apparatus 400. Furthermore, when establishing the connection, the connection establishment message processor 506 stores the notified mobile equipment identifier for identifying the mobile equipment, that is allocated to each mobile equipment by the base station apparatus 400, in the mobile equipment information storage 514.

The connection control unit 510 carries out a control related to the connection between the mobile equipment 500 to which the connection control unit 510 belongs and the base station apparatus 400.

After the communication between the mobile equipment 500 and the base station apparatus to which the connection setting was made is disconnected, the connection re-establishment message processor 508 generates a message required to re-establish a connection between the mobile equipment 500 and the base station apparatus that is capable of continuing the communication, and sends this message via the base station interface 502. This message required to re-establish the connection includes the network layer address of the base station apparatus that was communicating and is stored in the base station information storage 512, and the mobile equipment identifier that is allocated to the mobile equipment 500 and is stored in the mobile equipment information storage 514.

The connection control unit 510 carries out a process related to the re-establishment of the connection between the mobile equipment 500 to which the connection control unit 510 belongs and the base station apparatus.

The base station information storage 512 stores the network layer address information of the base station apparatus in the base station network 450, such as the IP address, that is notified from the base station apparatus 400 to which mobile equipment 500 establishes the connection.

The mobile equipment information storage 514 stores the mobile equipment identifier for identifying the mobile equipment, that is allocated to each mobile equipment by the base station apparatus 400, when establishing the connection.

Figure 9:
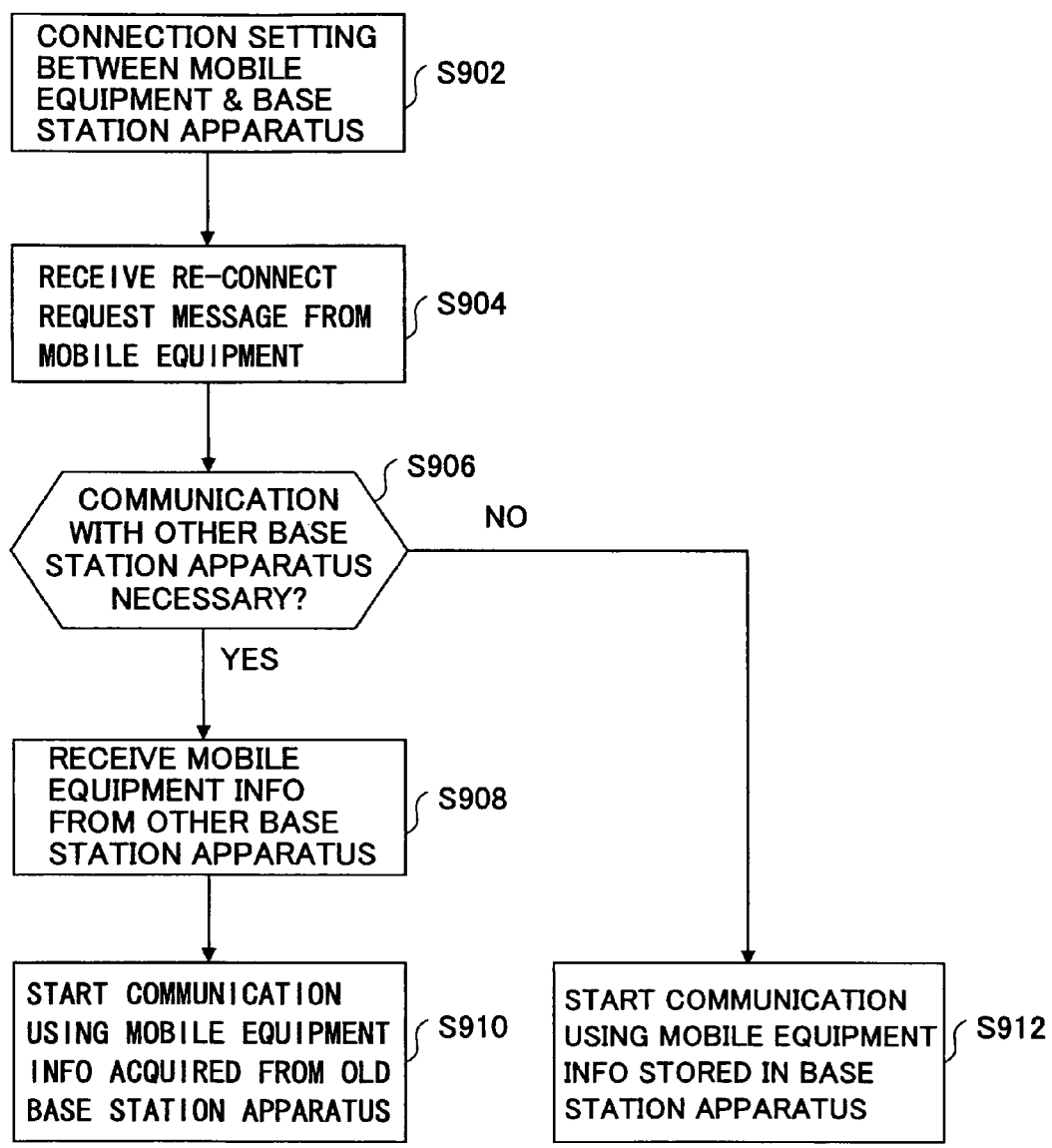
FIG. 9 is a flow chart for explaining an operation of the base station in the embodiment of the present invention.

Next, a description will be given of the operation of the base station apparatus 400 in this embodiment, by referring to FIG. 9. FIG. 9 is a flow chart for explaining the operation of the base station apparatus 400 in this embodiment of the present invention.

The connection request message processor 406 receives via the mobile equipment interface 402 the connection request message that is sent from the mobile equipment 500, and inputs the connection request message to the connection control unit 410.

Based on the input connection request message, the connection control unit 410 sets a connection between the base station apparatus 400 to which the connection control unit 410 belongs and the mobile equipment 500, in a step S902. When setting the connection, the connection control unit 410 allocates the mobile equipment identifier for identifying each mobile equipment, with respect to the mobile equipment 500 that made the connection establish request, and notifies the mobile equipment identifier to the mobile equipment 500, and also stores in the mobile equipment information storage 418 the mobile equipment information related to the connection setting in correspondence with the mobile equipment identifier. In addition, when establishing the connection, the connection control unit 410 notifies the network layer address information of the base station apparatus 400 in the base station network 450 to the mobile equipment 500. The mobile equipment 500 which receives the network layer address information of the base station apparatus 400 stores the network layer address information therein.

For example, if the mobile equipment 500 moves or the radio environment temporarily deteriorates to thereby disconnect the connection that has been established, the mobile equipment 500 detects the base station apparatus 400 that is capable of continuing the communication, and sends a reconnect request message for making the connection re-establish request to the detected base station apparatus 400. The base station apparatus 400 that receives this re-connect request message may be the base station apparatus that was communicating with the mobile equipment 500 or, a base station apparatus different from the base station apparatus that was communicating with the mobile equipment 500. The re-connect request message includes the mobile equipment identifier and the network layer address information of the base station apparatus notified in the step S902.

When the re-connect request message from the mobile equipment 500 is received, the re-connect request message processor 408 inputs the re-connect request message to the connection control unit 410, in a step S904.

Based on the input re-connect request message, the connection control unit 410 confirms the network layer address information of the base station apparatus included in the re-connect request message, and judges whether or not the mobile equipment 500 which made the connection re-establish request was communicating with the base station apparatus 400 to which the connection control unit 410 belongs before sending the re-connect request message. By making this judgement, the connection control unit 410 judges whether or not it is necessary to communicate with another base station apparatus in order to inquire the mobile equipment information of the mobile equipment 500 which made the connection re-establish request, in a step S906.

For example, as described above, the connection control unit 410 judges whether or not the network layer address notified by the re-connect request message from the mobile equipment 500 matches the network layer address allocated to the base station apparatus 400 to which the connection control unit 410 belongs. More particularly, the connection control unit 410 judges whether or not the network layer address information of the base station apparatus included in the re-connect request message matches the network layer address information of the base station apparatus (to which the connection control unit 410 belongs) stored in the base station information storage 416, and judges that it is unnecessary to communicate with another base station apparatus if the two network layer address information match, and judges that it is necessary to communicate with another base station apparatus if the two network layer address information do not match.

If it is judged that the mobile equipment 500 was communicating with the base station apparatus 400 to which the connection control unit 410 belongs and the judgement result in the step S906 is NO, the connection control unit 410 re-establishes the connection between the base station apparatus 400 and the mobile equipment 500 using the mobile equipment information that corresponds to the mobile equipment identifier notified by the re-connect request message and is stored in the mobile equipment information storage 418, in a step S912.

On the other hand, if it is judged that the mobile equipment 500 was communication with another base station apparatus that is different from the base station apparatus 400 to which the connection control unit 410 belongs and the judgement result in the step S906 is YES, the connection control 410 establishes a communication with the previously-communicating base station apparatus, using the network layer address notified from the mobile equipment 500. The establishment of the communication between the base station apparatus 400 and the previously-communicating base station apparatus depends on the protocol employed by the base station network 450. If the IP protocol is used as the network layer protocol employed by the base station network 450, for example, the connection control unit 410 communicates with the previously-communicating base station apparatus by sending IP packets to the IP address of the previously-communicating base station apparatus.

When the communication is established between the base station apparatus 400 and the previously-communicating base station apparatus, the mobile equipment information acquiring processing unit 414 requests acquisition of the mobile equipment information with respect to the previously-communicating base station apparatus. The mobile equipment information acquiring processing unit 414 sends to the previously-communicating base station apparatus the mobile equipment information acquisition request that includes the mobile equipment identifier notified by the re-connect request message. Based on the mobile equipment identifier included in the notified mobile equipment information acquisition request, the mobile equipment information acquiring processing unit 414 of the previously-communicating base station apparatus acquires the mobile equipment information corresponding to the mobile equipment identifier from the mobile equipment information storage 418 of the previously-communicating base station apparatus, and notifies the acquired mobile equipment information to the base station apparatus 400 that sent the mobile equipment information acquisition request.

The mobile equipment information acquiring processing unit 414 of the base station apparatus 400 receives the mobile equipment information sent from the previously-communicating base station apparatus, in a step S908.

The connection control unit 410 of the base station apparatus 400 re-establishes the connection with the mobile equipment 500, using the mobile equipment information received from the previously-communicating base station apparatus, in a step S910.

Figure 10:
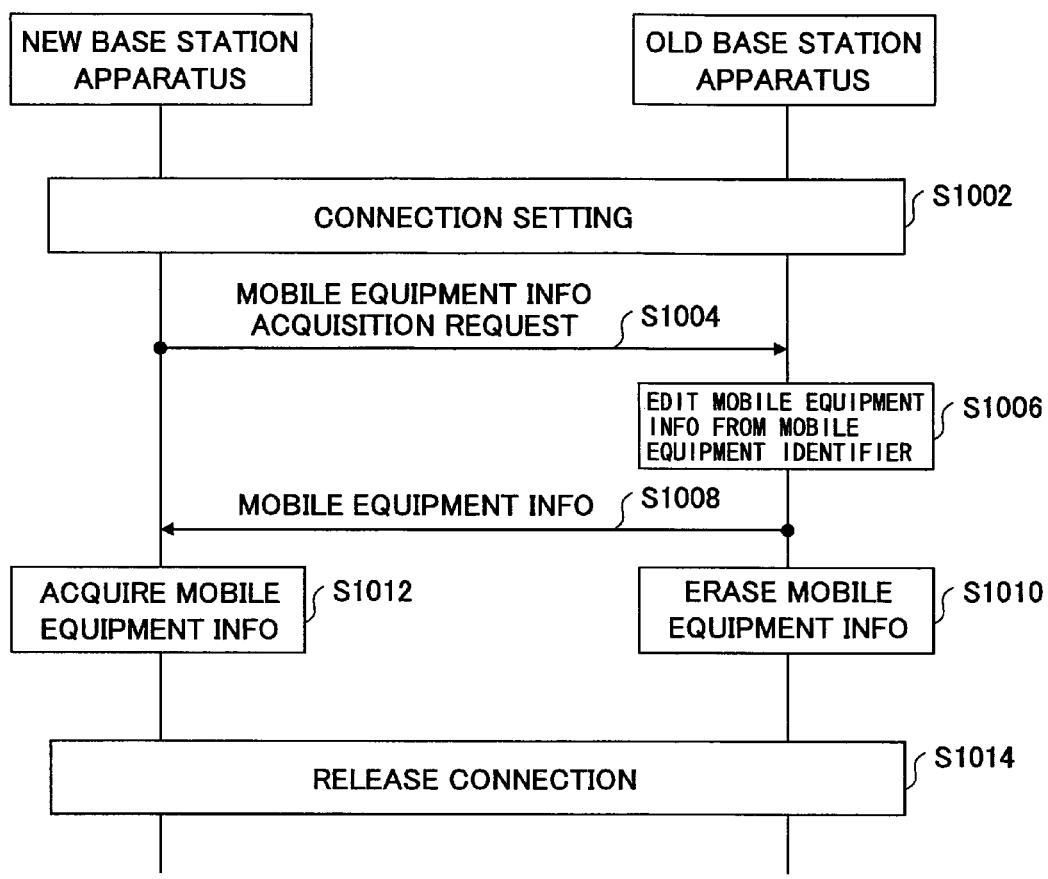
FIG. 10 is a flow chart for explaining the transmission and reception of the mobile equipment information between the base station apparatuses in the embodiment of the present invention.

Next, a description will be given of a process in which the base station apparatus (hereinafter referred to as the new base station apparatus) that covers the area of the moving destination of the mobile equipment 500 receives the mobile equipment information from the previously-communicating base station apparatus (hereinafter referred to as the old base station apparatus) that covers the area at the moving source of the mobile equipment 500, for a case where the new base station apparatus and the old base station apparatus are different, by referring to FIG. 10. FIG. 10 is a flow chart for explaining the transmission and reception of the mobile equipment information between the base station apparatuses in this embodiment of the present invention.

The connection control unit 410 of the new base station apparatus sets a connection to the connection control unit 410 of the old base station apparatus, in a step S1002.

The mobile equipment information acquiring processing unit 414 of the new base station apparatus makes a mobile equipment information acquisition request with respect to the mobile equipment information acquiring processing unit 414 of the old base station apparatus, in a step S1004. This mobile equipment information acquisition request includes the mobile equipment identifier of the mobile equipment which made the re-connect request with respect to the new base station apparatus.

Based on the mobile equipment identifier included in the mobile equipment information acquisition request, the mobile equipment information acquiring processing unit 414 of the old base station apparatus acquires the mobile equipment information corresponding to the mobile equipment identifier from the mobile equipment information storage 418 of the old base station apparatus, and edits the acquired mobile equipment information, in a step S1006.

The mobile equipment information acquiring processing unit 414 of the old base station apparatus sends the edited mobile equipment information to the new base station apparatus, in a step S1008. The mobile equipment information acquiring processing unit 414 of the old base station apparatus deletes from the mobile equipment information storage 418 of the old base station apparatus the mobile equipment information that is sent to the new base station apparatus, in a step S1010.

When the mobile equipment information acquiring processing unit 414 of the new base station apparatus acquires the mobile equipment information from the old base station apparatus in a step S1012, the mobile equipment information acquiring processing unit 414 of the new base station apparatus inputs the acquired mobile equipment information to the connection control unit 410 of the new base station apparatus.

Based on the mobile equipment information, the connection control unit 410 of the new base station apparatus releases the connection between the new base station apparatus and the old base station apparatus, in a step S1014.

Accordingly, the base station apparatus which receives the re-connect request message from the mobile equipment 500 can carry out a connection re-establishing process to re-establish the connection to the mobile equipment 500, using the mobile equipment information that is stored in the base station apparatus or, the mobile equipment information that is acquired from the old base station apparatus.

The base station apparatus 400 which re-establishes the connection to the mobile equipment 500 notifies the core network 200 that the communication with the mobile equipment 500 has started. Hence, by re-establishing the connection to the mobile equipment 500 by inheriting the mobile equipment information that was used by the old base station apparatus, and notifying the re-establishment of the communication to the core network 200, it is possible to re-establish the radio layer communication in a state where the communication between the mobile equipment 500 and the core network 200 is maintained.

Figure 11:
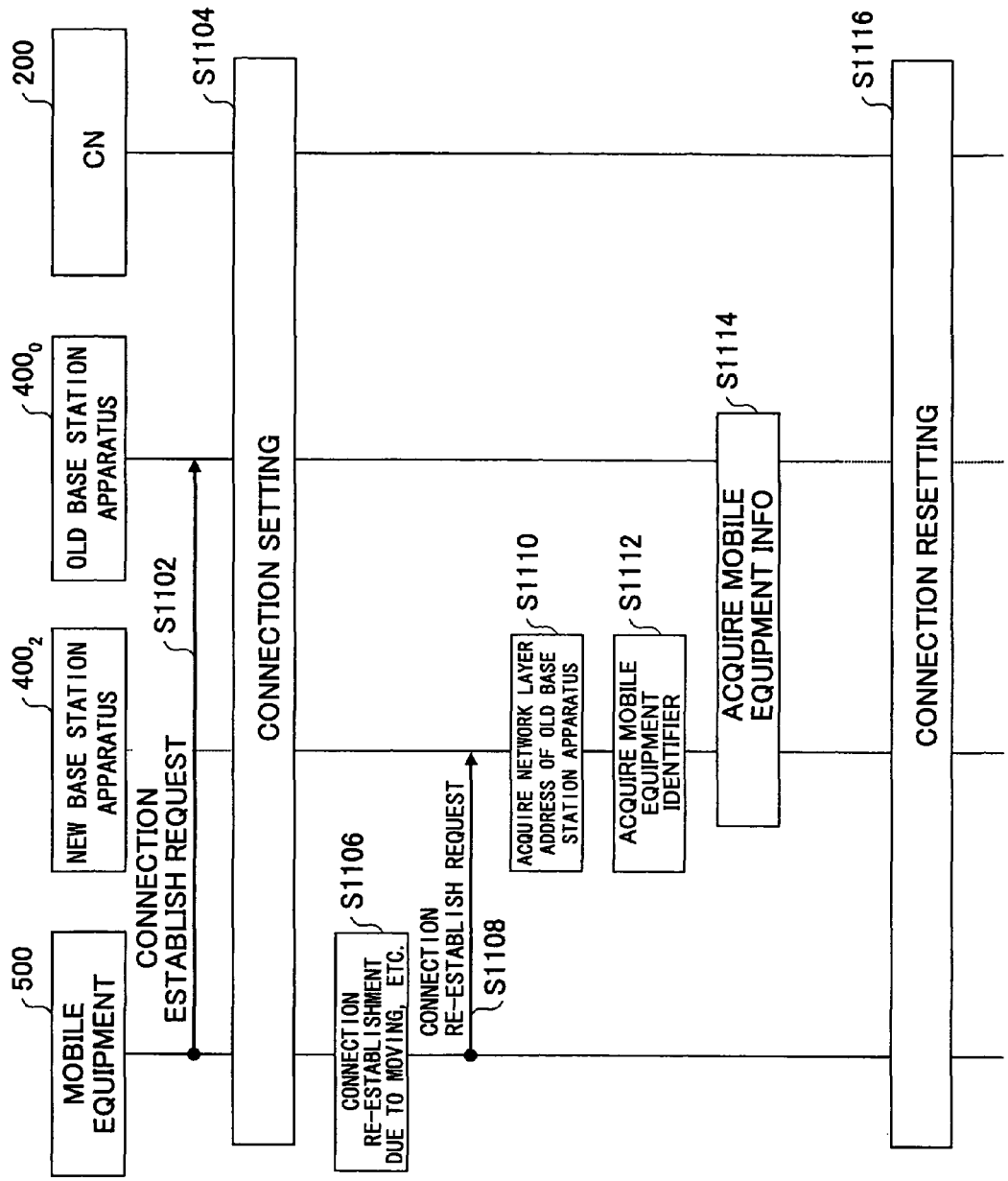
FIG. 11 is a flow chart for explaining a sequence from a call connection up to the mobile control in the embodiment of the present invention.

Next, a description will be given of a sequence from a call connection up to the mobile control, by referring to FIG. 11. FIG. 11 is a flow chart for explaining the sequence from the call connection up to the mobile control in this embodiment of the present invention.

Figure 12:
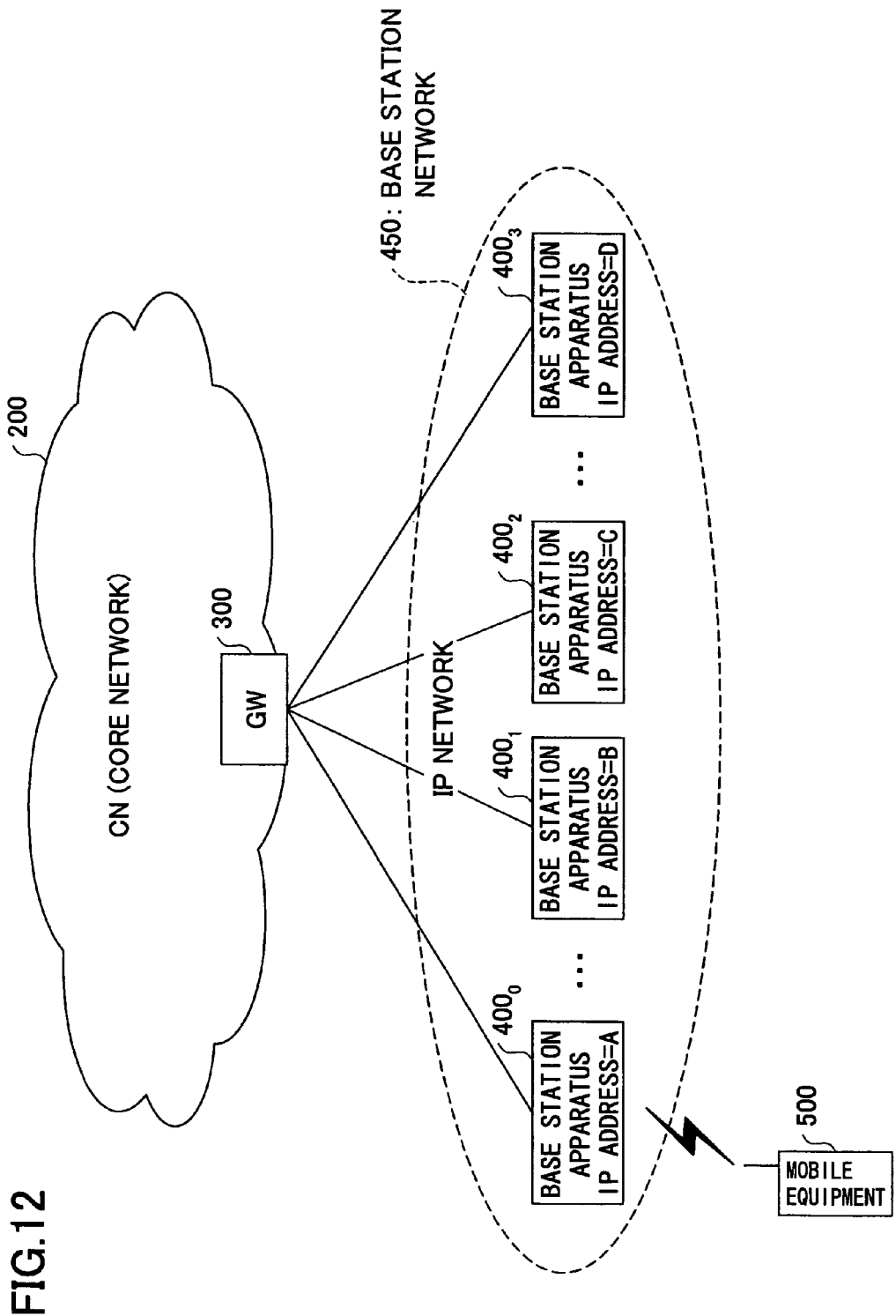
FIG. 12 is a diagram for explaining a structure of the system in the embodiment of the present invention.

As shown in FIG. 12, a description will be given of a case in this embodiment where IP addresses A, B, C and D are respectively allocated with respect to the base station apparatuses $400_0$, $400_1$, $400_2$ and $400_3$ in the system structure shown in FIG. 6. FIG. 12 is a diagram for explaining the structure of the system in this embodiment of the present invention. In addition, it is assumed for the sake of convenience that the mobile equipment 500 moves from the area covered by the base station apparatus $400_0$ to the area covered by the base station apparatus $400_2$. Accordingly, the base station apparatus $400_0$ corresponds to the old base station apparatus shown in FIG. 11, and the base station apparatus $400_2$ corresponds to the new base station apparatus shown in FIG. 11. The communication among the plurality of base station apparatuses $400_0$, $400_1$, $400_2$ and $400_3$ is possible via the base station network 450 such as the IP network, and the transport layer protocol, such as the TCP protocol, may be employed in the base station network 450.

The core network 200 can communicate with the mobile equipment 500 via the base station apparatus 400, and exchanges the data for the mobile equipment 500 with the base station apparatus 400 that covers the area in which the mobile equipment 500 is located. Furthermore, when the mobile equipment 500 moves and the base station apparatus 400 that covers the area in which the mobile equipment 500 is located changes, the core network 200 receives a notification of this change from the base station apparatus 400, and changes the base station apparatus with which the data for the mobile equipment 500 is exchanged.

The connection establishment message processor 506 of the mobile equipment 500 detects the base station apparatus 400 with which a communication can be established, and sends a connection establish request with respect to the base station apparatus $400_0$, in a step S1102.

A connection setting is made between the connection control unit 510 of the mobile equipment 500 and the connection control unit 410 of the base station apparatus $400_0$, in a step S1104.

For example, if the mobile equipment 500 moves and the established connection is disconnected or, the radio environment temporarily deteriorates and the established connection is disconnected, the connection control unit 510 of the mobile equipment 500 detects the base station apparatus $400_2$ that is capable of continuing the communication, and re-establishes a connection, in a step S1106.

The connection re-establishment message processor 508 of the mobile equipment 500 requests re-establishment of the connection with respect to the base station apparatus $400_2$, in a step S1108.

When the re-connect request message processor 408 of the base station apparatus $400_2$ receives the connection re-establish request from the mobile equipment 500, the re-connect request message processor 408 acquires the network layer address of the old base station apparatus and the mobile equipment identifier that are included in the connection re-establish request, in steps S1110 and S1112, and inputs the network layer address and the mobile equipment identifier to the connection control unit 410. In this case, the re-connect request message processor 408 of the base station apparatus $400_2$ acquires the IP address A as the network layer address of the base station apparatus $400_0$.

Based on the input network layer address, the connection control unit 410 of the base station apparatus $400_2$ judges whether or not the area in which the mobile equipment 500 was located before moving is the same as the area covered by the base station apparatus $400_2$. In other words, the base station apparatus $400_2$ judges whether or not it is necessary to inquire the information of the mobile equipment 500 to another base station apparatus. If it is unnecessary to inquire the information of the mobile equipment 500, that is, if the input network layer address matches the network layer address of the base station apparatus $400_2$, the connection is re-established using the mobile equipment information stored in the base station apparatus $400_2$.

In this particular case, the input network layer address, namely, the IP address A, does not match the network layer address, namely, the IP address C of the base station apparatus $400_2$. Hence, the connection control unit 410 of the base station apparatus $400_2$ judges that it is necessary to inquire the information of the mobile equipment 500 to another base station apparatus.

The connection control unit 410 of the base station apparatus $400_2$ establishes a connection with the base station apparatus $400_0$. The mobile equipment information acquiring processing unit 414 of the base station apparatus $400_2$ requests the mobile equipment information with respect to the base station apparatus $400_0$. The mobile equipment information acquiring processing unit 414 of the base station apparatus $400_0$ sends the mobile equipment information stored in the mobile equipment information storage 418 thereof to the base station apparatus $400_2$ according to the mobile equipment information acquisition request from the base station apparatus $400_2$, in a step S1114.

The connection control unit 410 of the base station apparatus $400_2$ makes a resetting of the connection to the mobile equipment 500 using the notified mobile equipment information, in a step S1116.

Figure 13:
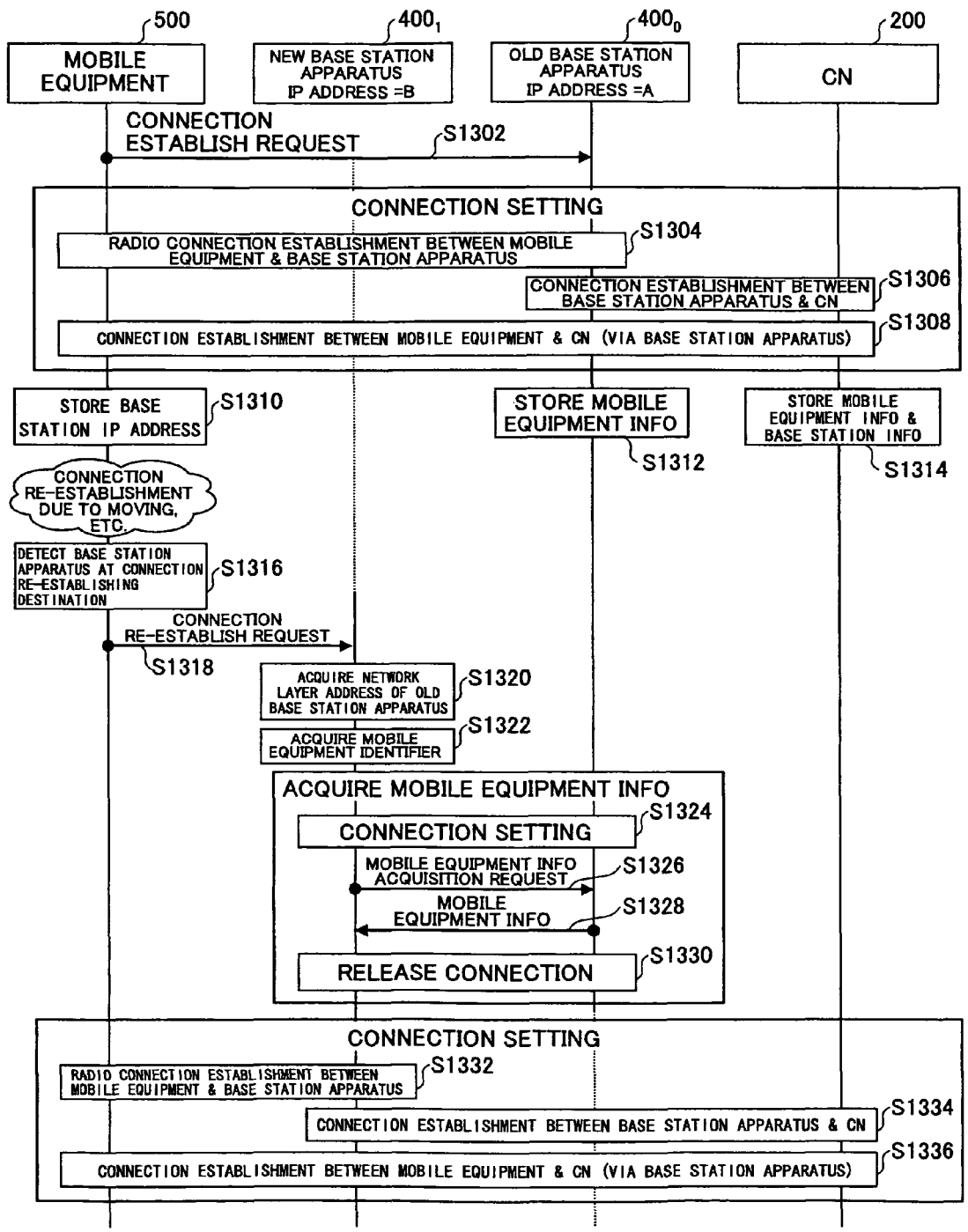
FIG. 13 is a flow chart for explaining the sequence from the call connection up to the mobile control in the embodiment of the present invention.

Next, a more detailed description will be given of the sequence from the call connection up to the mobile control, by referring to FIG. 13. FIG. 13 is a flow chart for explaining the sequence from the call connection up to the mobile control in the embodiment of the present invention.

A description will be given of this embodiment for a case where the mobile equipment 500 moves from the area that is covered by the base station apparatus $400_0$ to the area that is covered by the base station apparatus $400_1$ in the system structure shown in FIG. 12. Hence, the base station apparatus $400_0$ corresponds to the old base station apparatus shown in FIG. 13, and the base station apparatus $400_1$ corresponds to the new base station apparatus shown in FIG. 13.

The connection establishment message processor 506 of the mobile equipment 500 detects the base station apparatus $400_0$ that is connectable thereto, and sends a connection establish request with respect to the base station apparatus $400_0$, in a step S1302.

Next, a connection is set between the connection control unit 510 of the mobile equipment 500 and the connection control unit 410 of the base station apparatus $400_0$, in a step S1304. Then, a connection is established between the connection control unit 410 of the base station apparatus $400_0$ and the core network 200, in a step S1306. Further, a connection is established between the connection control unit 510 of the mobile equipment 500 and the core network 200, via the base station apparatus $400_0$, in a step S1308.

The connection establishment message processor 506 of the mobile equipment 500 stores the IP address of the base station apparatus $400_0$ that is notified from the base station apparatus $400_0$ to which the connection is established, in the base station information storage 512, in a step S1310. The connection request message processor 406 of the base station apparatus $400_0$ stores the mobile equipment information related to the connection of the mobile equipment 500 to which the connection is established, in the mobile equipment information storage 418 in correspondence with the mobile equipment identifier, in a step S1312. For example, a home location register (not shown) in the core network 200 stores the mobile equipment information and the base station information, in a step S1314.

For example, if the mobile equipment 500 moves and the established connection is disconnected or, the radio environment temporarily deteriorates and the established connection is disconnected, the mobile equipment 500 detects the base station apparatus 400 that is capable of continuing the communication, in a step S1316.

Next, with respect to the detected base station apparatus $400_1$, the connection re-establishment message processor 508 of the mobile equipment 500 sends a re-connect request message for making the connection re-establish request, in a step S1318.

When the re-connect request message processor 408 of the base station apparatus $400_1$ receives the re-establish request message from the mobile equipment 500, the re-connect request message processor 408 acquires the network layer address of the old base station apparatus and the mobile equipment identifier that are included in the re-establish request message, in steps S1320 and S1322, and inputs the network layer address and the mobile equipment identifier to the connection control unit 410 of the base station apparatus $400_1$. In this case, the re-connect request message processor 408 of the base station apparatus $400_1$ acquires the IP address A as the network layer address of the base station apparatus $400_0$.

Based on the input network layer address, the connection control unit 410 of the base station apparatus $400_1$ judges whether or not the area covered by the base station apparatus $400_1$ is the same as the area in which the mobile equipment 500 was located before moving. In other words, the connection control unit 410 of the base station apparatus $400_1$ judges whether or not it is necessary to inquire the information of the mobile equipment 500 to another base station apparatus. If it is unnecessary to inquire the information of the mobile equipment 500 to another base station apparatus, that is, if the input network layer address matches the network layer address of the base station apparatus $400_1$, the mobile equipment information stored in the base station apparatus $400_1$ is used to re-establish the connection.

In this particular case, the input network layer address, namely, the IP address A, does not match the network layer address of the base station apparatus $400_1$, namely, the IP address B. For this reason, connection control unit 410 of the base station apparatus $400_1$ judges that it is necessary to inquire the information of the mobile equipment 500 to another base station apparatus.

The connection control unit 410 of the base station apparatus $400_1$ establishes a connection to the base station apparatus $400_0$, in a step S1324. The mobile equipment information acquiring processor 414 of the base station apparatus $400_1$ requests acquisition of the mobile equipment information with respect to the base station apparatus $400_0$, in a step S1326. According to the mobile equipment information acquisition request received from the base station apparatus $400_1$, the mobile equipment information acquiring processor 414 of the base station apparatus $400_0$ sends the mobile equipment information that is stored in the mobile equipment information storage 418 of the base station apparatus $400_0$ and corresponds to the mobile equipment identifier included in the mobile equipment information acquisition request, in a step S1328.

The connection control unit 410 of the base station apparatus $400_1$ releases the connection to the base station apparatus $400_0$, in a step S1330.

The connection control unit 410 of the base station apparatus $400_1$ uses the notified mobile equipment information to carry out a resetting of the connection to the mobile equipment 500, in a step S1332. Next, a connection is set between the connection control unit 410 of the base station apparatus $400_1$ and the core network 200, in a step S1334. Further, a connection is set between the connection control unit 510 of the mobile equipment 500 and the core network 200, via the base station apparatus $400_1$, in a step S1336.

In the radio mobile communication system according to this embodiment, the base station apparatus at the moving destination of the mobile equipment can acquire the mobile equipment information from the old base station apparatus when carrying out the mobile control, so as to re-establish the communication with the mobile equipment.

If each base station apparatus were made to store the information of the adjacent or surrounding base station apparatuses as the management area of the mobile equipment becomes smaller, the system data and the system and layout design would become complex. But according to this embodiment, it is possible to exchange the mobile equipment information in a state where each base station apparatus does not store the information of the adjacent or surrounding base station apparatuses.

This application claims the benefit of a Japanese Patent Application No. 2006-326174 filed Dec. 1, 2006, in the Japanese Patent Office, the disclosure of which is hereby incorporated by reference.

Further, the present invention is not limited to these embodiments, but various variations and modifications may be made without departing from the scope of the present invention.

What is claimed is:

1. A Long Term Evolution (LTE) system, comprising:
a plurality of base station apparatuses including a first base station apparatus and a second base station apparatus; and
a mobile equipment configured to make a connection setting by setting a connection to the first base station apparatus, and after a communication with the first base station apparatus is disconnected, to make a re-connect request to the second base station apparatus that is capable of continuing the communication,
wherein the mobile equipment is allocated with a mobile equipment identifier for identifying the mobile equipment when making the connection setting, and is notified of the mobile equipment identifier and an address of a network layer allocated to the first base station apparatus to which the connection setting is made;
wherein the second base station apparatus acquires mobile equipment information related to the connection setting from the first base station when an address of a network layer allocated to the second base station apparatus does not match an address of the network layer allocated to the first base station apparatus;
said mobile equipment comprising:
a connection re-establishment message processor configured to generate a re-connect request that includes the address of the network layer allocated to the first base station apparatus and the mobile equipment identifier, and to send the re-connect request to the second base station apparatus; and
a connection control unit configured to re-establish the connection to the second base station apparatus,
wherein said connection control unit re-establishes the connection according to the mobile equipment information related to the connection setting acquired by the second base station apparatus, based on the address of the network layer allocated to the first base station apparatus and the mobile equipment identifier.

2. The LTE system as claimed in claim 1, wherein each of the plurality of base station apparatuses forming an IP network is allocated with an IP address;
wherein said mobile equipment is notified of an IP address from the first base station apparatus to which the connection setting is made; and
wherein said connection re-establishment message processor generates the re-connect request including the IP address as the address of the network layer.

3. A base station apparatus configured to receive a re-connect request that is sent from a mobile equipment whose connection to an arbitrary base station apparatus is disconnected in a Long Term Evolution (LTE) system, and to reconnect the base station apparatus to the mobile equipment,
wherein the re-connect request includes a mobile equipment identifier for identifying a mobile equipment that is allocated when making a connection setting to the arbitrary base station apparatus, and an address of a network layer allocated to the arbitrary base station apparatus to which the connection setting is made by the mobile equipment prior to sending the re-connect request,
said base station apparatus comprising:
a base station information storage configured to store an address of the network layer allocated to the base station apparatus;
a mobile equipment information storage configured to store mobile equipment information related to the connection setting of the mobile equipment when the connection setting is made to the arbitrary base station apparatus;
a connection control unit configured to reset the connection to the mobile equipment based on the mobile equipment information corresponding to the mobile equipment identifier; and
a first processing unit configured to acquire mobile equipment information related to the connection setting from the arbitrary base station apparatus to which the mobile equipment is connected prior to the disconnection when the address of the network layer allocated to the base station apparatus does not match the address of the network layer allocated to the arbitrary base station apparatus.

4. The base station apparatus as claimed in claim 3, wherein said mobile equipment information storage stores a mobile equipment identifier, and the mobile equipment information related to the connection setting of the mobile equipment and corresponding to the mobile equipment identifier, in correspondence with each other; and
wherein said connection control unit resets the connection to the mobile equipment using the mobile equipment information corresponding to the mobile equipment identifier included in the re-connect request stored in said mobile equipment information storage, when the address of the network layer allocated to the arbitrary base station apparatus included in the re-connect request matches the address of the network layer that is allocated to the base station apparatus and is stored in said base station information storage.

5. The base station apparatus as claimed in claim 3, further comprising:
a second processing unit configured to request the mobile information with respect to the mobile equipment that made the re-connect request;
wherein said connection control unit sets a connection to the arbitrary base station apparatus whose connection is disconnected based on the address of the network layer allocated to the arbitrary base station apparatus included in the re-connect request, when the address of the network layer allocated to the arbitrary base station apparatus included in the re-connect request does not match the address of the network layer that is allocated to the base station apparatus and is stored in said base station information storage; and
wherein said second processing unit sends the mobile equipment identifier included in the re-connect request to the address of the network layer allocated to the arbitrary base station apparatus included in the re-connect request, and acquires the mobile equipment information of the mobile equipment that made the re-connect request from the arbitrary base station apparatus whose connection is disconnected.

6. The base station apparatus as claimed in claim 5, wherein said connection control unit disconnects the connection to the arbitrary base station apparatus whose connection to the mobile equipment is disconnected, after said second processing unit acquires the mobile equipment information from the arbitrary base station apparatus whose connection to the mobile equipment is disconnected.

7. The base station apparatus as claimed in claim 5, wherein said connection control unit resets the connection to the mobile equipment that made the re-connect request, using the mobile equipment information acquired by the second processing unit.

8. The base station apparatus as claimed in claim 3, wherein:
each of a plurality of base station apparatuses forming an IP network is allocated with an IP address; and
said base station information storage stores an IP address as the address of the network layer allocated to the base station apparatus.

9. A communication control method in which a connection setting is made between a mobile equipment and a base station apparatus of a Long Term Evolution (LTE) system, comprising:
notifying a mobile equipment identifier allocated to each mobile equipment and an address of a network layer allocated to the base station apparatus to which the connection setting is made to the mobile equipment when making the connection setting;
after a communication between the mobile equipment and the base station apparatus is disconnected, sending a re-connect request from the mobile equipment to an arbitrary base station apparatus that is capable of continuing the communication,
wherein the re-connect request includes the address of the network layer allocated to the base station apparatus and the mobile equipment identifier from the mobile equipment;
acquiring, from the base station apparatus, mobile equipment information related to the connection setting of the mobile equipment by the arbitrary base station apparatus when an address of a network layer allocated to the arbitrary base station apparatus does not match the address of the network layer allocated to the base station apparatus; and
resetting the connection between the arbitrary base station apparatus and the mobile equipment that made the re-connect request, based on the address and the mobile equipment identifier included in the re-connect request, the address of the network layer allocated to the arbitrary base station apparatus, and the mobile equipment information related to the connection setting of the mobile equipment that has the connection setting to the arbitrary base station apparatus.

10. The communication control method as claimed in claim 9, wherein said resetting the connection re-establishes a connection between the arbitrary base station apparatus and the mobile equipment using the mobile equipment information corresponding to the mobile equipment identifier stored in the arbitrary base station apparatus, when the address of the network layer allocated to the base station apparatus included in the re-connect request matches the address of the network layer allocated to the arbitrary base station apparatus.

11. The communication control method as claimed in claim 9, further comprising:
setting, by the arbitrary base station apparatus, a connection to the base station apparatus whose connection is disconnected, based on the address of the network layer allocated to the arbitrary base station apparatus included in the re-connect request, when the address of the network layer allocated to the arbitrary base station apparatus included in the re-connect request does not match the address of the network layer allocated to the base station apparatus; and
requesting, from the arbitrary base station apparatus, the mobile equipment information, with respect to the base station apparatus, based on the mobile equipment identifier included in the re-connect request.

12. The communication control method as claimed in claim 9, wherein the address of the network layer is an IP address.

13. The LTE system as claimed in claim 1, wherein the second base station apparatus acquires the mobile equipment information from the first base station that stores the mobile equipment information, based on the mobile equipment identifier.

14. The base station apparatus as claimed in claim 2, wherein the first processing unit acquires the mobile equipment information from the arbitrary base station that stores the mobile equipment information, based on the mobile equipment identifier.

15. The communication control method as claimed in claim 9, wherein the acquiring acquires the mobile equipment information from the base station apparatus that stores the mobile equipment information, based on the mobile equipment identifier.

* * * * *